UNITED STATES PATENT OFFICE 2,525,794

PREPARATION OF BETA-AMINO CARBOXYLIC ACIDS BY THE REACTION OF AMMONIA WITH BETA-LACTONES

Thomas L. Gresham and Forrest W. Shaver, Akron, Ohio, assignors to The B. F. Goodrich Company, New York, N. Y., a corporation of New York No Drawing. Application May 21, 1948, Serial No. 28,516

7 Claims. (Cl. 260—534)

This invention relates to a method for the preparation of beta-amino carboxylic acids by the reaction of beta-lactones with ammonia and pertains more particularly to the preparation of beta-alanine (also called beta-aminopropionic acid) by the addition of ammonia to a solution of beta-propiolactone in certain nitrogen or oxygen-containing polar organic solvents.

It is disclosed in U. S. Patent 2,356,459 to Frederick E. Küng that beta-lactones, that is, lactones or inner esters of beta-hydroxy carboxylic acids may be obtained in good yields by the reaction of a ketene with an aldehyde or ketone. In this manner beta-propiolactone (also called hydracrylic acid lactone) which has the structure

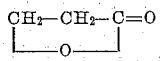

may be economically obtained from ketene and formaldehyde.

It is further disclosed in U. S. Patent 2,375,005 to Küng that ammonia will react with beta-lactones to give amides of beta-hydroxy carboxylic acids and that this reaction is favored by heating the beta-lactone to about 100° C. under pressure with an excess of liquid ammonia.

We have now discovered, however, that when gaseous ammonia is added to a solution of a beta-lactone in a nitrogen or oxygen containing polar organic solvent of the type defined more particularly hereinbelow, a liquid phase reaction occurs quite rapidly at ordinary atmospheric temperature and pressure to give in high yield a beta-amino carboxylic acid substantially according to the following equation:

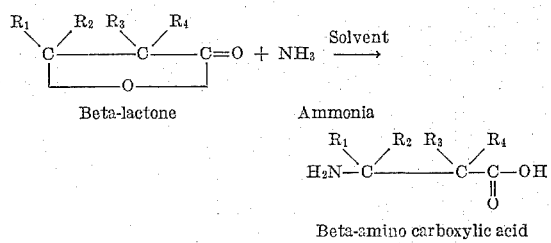

The beta-lactone employed in the reaction is one possessing the general formula

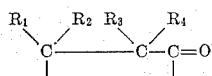

wherein each R represents hydrogen or an alkyl, cycloalkyl or aryl radical containing from 1 to 6 carbon atoms. Examples of suitable beta-lactones include beta-propiolactone, beta-butyrolactone, beta-isobutyrolactone, beta-valerolactone, beta-isovalerolactone, beta-n-caprolactone, alpha-ethyl-beta-propiolactone, alpha-isopropyl-beta-propiolactone, beta-phenyl-beta-propiolactone, beta-cyclohexyl-beta-propiolactone, alpha-phenyl-beta-propiolactone, alpha - butyl - beta-propiolactone, alpha-methyl-beta-butyrolactone, alpha-ethyl-beta - butyrolactone, beta - methyl-beta-valerolactone and the like. The preferred members of this class are those saturated aliphatic beta-lactones which are soluble in water (those beta-lactones containing no more than about six carbon atoms possess this property), and especially beta-propiolactone which, as has been disclosed hereinabove, can be economically prepared in excellent yields from ketene and formaldehyde.

As has been indicated, the nature of the solvent used is of considerable importance to the success of the reaction. Although the reaction illustrated by the above equation may take place, at least to some extent, in the presence of any polar organic solvent, other reactions occur with many types of solvents, both polar and non-polar, to such an extent that the product obtained is a mixture of several materials from which it is practically impossible to secure any significant quantity of the desired beta-amino acid. One competing reaction is that between the beta-lactone and ammonia to give an amide, another is the reaction which occurs between the beta-lactone and certain solvents, another is the reaction which occurs between ammonia and certain solvents and still another involves the polymerization of the beta-lactone to give polyester acids.

Quite surprisingly, however, none of these other possible reactions occurs to a prohibitive extent when the solvent utilized is one which is stable to water (that is, does not react with water when added thereto), and whose degree of ionization therein is less than that of ammonia, and which contains from 1 to 12 carbon atoms and at least one atom of an element whose atomic number is greater than 6 but less than 9 (that is, nitrogen or oxygen) connected to one only of the carbon atoms. Since the reaction is effected in the liquid phase preferably under atmospheric conditions of temperature and pressure, the solvent used must also, of course, be capable of existing in the liquid state under conditions of the reaction, it being understood that liquid mixtures of compounds may be used as the solvent even though one or more of the components of the mixture is a solid under the operating conditions in the pure state. Solvents of this nature will dissolve the beta-lactone (beta-lactones of the kind used in this invention are generally soluble in polar organic solvents) but do not dissolve beta-amino carboxylic acids (which are generally soluble in water but insoluble or very sparingly soluble in organic solvents) and hence in addition to providing a convenient medium for the reaction, afford a convenient means of separating and recovering the desired reaction product.

Any solvent having the chemical and physical characteristics set forth in the preceding paragraph may be employed in this invention regardless of its specific chemical class. Classes of organic compounds in which a nitrogen atom is attached to a single carbon atom include organic nitriles (which possess the general structure R—CN, R being used here and whenever appearing hereinafter to denote an organic radical having its connecting valences on a carbon atom), organic nitro and nitroso compounds (R—NO₂ and R—NO), oximes and hydroxylamines

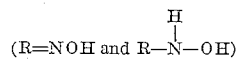

and azo compounds (R—N=N—R) as well as other nitrogen-containing compounds, and classes of organic compounds in which an oxygen atom is attached to a single carbon atom include alcohols and phenols (ROH), esters of alcohols or phenols with inorganic oxy-acids such as nitric, nitrous or phosphoric acids (for example, R—O—NO, R—O—NO₂,

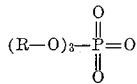

and the like), carboxylic acids and their derivatives such as esters, anhydrides, and amides

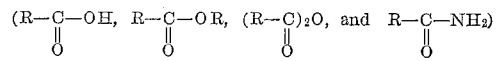

ketones

aldehydes

ketenes (R=C=O) and other classes of compounds characterized by the presence of a carbonyl or hydroxyl group. Various specific compounds of each of these classes are stable to water and possess a degree of ionization therein less than that of ammonia, are liquid under atmospheric conditions and will dissolve ammonia and beta-lactones and hence can serve as the solvent in this invention.

Because of many factors, however, including availability and cost as well as efficiency in the process, it is definitely preferred that the solvent used be a member of one of a relatively few chemical classes, more particularly that it be an alcohol, an ester or a nitrile. Alcohols having the required physical characteristics are, as a class, very efficient solvents for the reaction of this invention and enable the desired product to be obtained in high yields, which is particularly surprising in view of the fact that alcohols react with beta-lactones to give either beta-alkoxy carboxylic acids or esters of beta-hydroxy carboxylic acids. But despite this fact, the addition of ammonia to an alcohol solution of a beta-lactone results in high yields of a beta-amino carboxylic acid, without appreciable formation of these other possible reaction products.

Specific alcohols which may be used include methyl, ethyl, n-propyl, isopropyl, n-butyl, isobutyl, tertiary butyl, and the various amyl, hexyl, heptyl, octyl, nonyl and decyl alcohols; allyl and propiolic alcohols and their homologs containing up to 12 carbon atoms; cyclohexyl and benzyl alcohols and other cyclic alcohols containing up to 10 carbon atoms; as well as alcohols (which are liquid under atmospheric conditions) containing more than one function, that is, substituted derivatives of any of the above alcohols as illustrated (in the case of ethyl alcohol) by such specific compounds as ethylene glycol, ethylene chlorohydrin, ethylene cyanohydrin, 2-nitro ethanol, beta-ethoxy ethanol, diethylene glycol monoethyl ether, diethylene glycol monobutyl ether, and the like. It is thus seen that the alcohol may be aliphatic, alicyclic or aromatic, saturated or unsaturated, primary, secondary or tertiary, and substituted or unsubstituted. Best results are secured with unsubstituted saturated aliphatic alcohols and of these the tertiary alcohols such as tertiary-butanol, tertiary-amyl alcohol, triethyl carbinol and tertiary-decyl alcohol, have been found to be decidedly superior, because of the nearly theoretical yields of product obtained, to those which are primary or secondary.

Esters of any of the alcohols set forth in the preceding paragraph with either inorganic oxy-acids or with organic carboxylic acids are substantially as effective as solvents for the reaction as are the non-tertiary alcohols, provided of course that they are not too high in molecular weight and are liquid under atmospheric conditions. Specific esters which may be used include methyl nitrate, ethyl nitrate, amyl nitrite, hexyl nitrite, butyl nitrite, butyl nitrate, and other esters of alcohols with inorganic oxy-acids; methyl acetate, ethyl acetate, methyl propionate, isopropyl acetate, isobutyl propionate, allyl acetate, benzyl acetate, ethyl furoate, allyl butyrate, butyl butyrate, ethyl butyrate, methyl butyrate, diethyl succinate, ethyl acetoacetate and the like.

Aside from the tertiary alcohols, the most effective solvents for the reaction of this invention are the organic nitriles. Included in this class of compounds are acetonitrile, propionitrile, crotononitrile, vinyl acetonitrile, acrylonitrile, valeronitrile, isocapronitrile, caprylonitrile, benzonitrile, alpha-tolunitrile, m-tolunitrile, succinonitrile, malonitrile, glutaronitrile, alpha-keto-alpha-tolunitrile, and the like. The preferred nitriles are those of aliphatic carboxylic acids, particularly saturated aliphatic monocarboxylic acids.

Other solvents, not entirely the equivalent of alcohols, esters and nitriles, but which nevertheless permit the obtainment of substantial yields of beta-amino carboxylic acids are the ketones such as acetone, methyl ethyl ketone, diethyl ketone, methyl propyl ketone, methyl isopropyl ketone, methyl n-butyl ketone, ethyl propyl ketone, dipropyl ketone, vinyl phenyl ketone and the like; and the aldehydes such as acetaldehyde, propionaldehyde, n-butyraldehyde, isobutyraldehyde, valeraldehyde, isovaleraldehyde, trimethylacetaldehyde, n-caproic aldehyde, heptaldehyde, acrylic aldehyde, crotonaldehyde, propargyl aldehyde, benzaldehyde and the like. The yield obtained when ketones and aldehydes are utilized as solvents is less than that secured with alcohols, esters and nitriles which is believed due to the fact that the ketones and aldehydes react to a certain degree with the beta-amino carboxylic acids formed by the reaction.

Certain organic nitro compounds, phenols, organic carboxylic acids, and their anhydrides and amides which are stable to water and possess a degree of ionization therein less than that of ammonia, may also be used as solvents for the invention. Among these compounds are included organic nitro compounds such as nitromethane, nitroethane, 1-nitropropane, 2-nitropropane, 1-nitrobutane, 1-nitropentane, 1-nitropentene, nitrobenzene, nitrotoluene, and the like; certain phenols such as phenol itself, o-, and m-cresol, hydroxy-styrenes, cumenol and the like; certain organic carboxylic acids and their amides such as propionic acid, butyric acid, valeric acid, caproic acid, acetamide, formamide, propionamide and the like. These nitro compounds, phenols, carboxylic acids and amides do not form a preferred class of solvents for the reaction because of their tendency to form salts with ammonia, making the separation of the desired beta-amino carboxylic acid from the reaction mixture more difficult than when alcohols, esters and nitriles are used as solvents. Acetic acid is not included as a solvent for the reaction since its degree of ionization in water is .004, which is the same as that of ammonia. Similarly, organic acids more highly ionized in water than acetic acid are not contemplated as solvents, nor are organic bases more highly ionized than ammonia.

It is to be understood that those compounds of the classes listed hereinabove which are insoluble in water possess a degree of ionization in water of substantially 0, and therefore, this value being lower than the degree of ionization of ammonia, such compounds are also included as solvents for the reaction of this invention regardless of their water insolubility.

In all of the various classes of solvents utilized it has developed that compounds having a dipole moment above 1.5 are more effective than those having a lower dipole moment. It has also developed that those solvents which are substantially neutral (that is, those solvents which when added to water, whether or not water soluble, do not appreciably change the pH of the water) are more desirable for use in the reaction than those solvents which are characteristically acidic or basic.

In addition to the above characteristics, it is further desirable that a volatile solvent, preferably having a boiling point below 150° C. be used, since the beta-amino carboxylic acid is more easily separated from the reaction mixture and the solvent can be readily recovered and reused in the process.

In carrying out the reaction of this invention the beta-lactone is added to the solvent medium and then ammonia in the gaseous form or in a solution with the solvent is added to the resulting solution whereupon reaction occurs to form the amino acid which precipitates from the solution. The amino acid is readily removed from the reaction medium, for example, by filtering or other usual means, and is purified, preferably by dissolving in water and recrystallizing in alcohol solution. Amino acids, and especially beta-alanine, can be obtained in very pure form in this manner.

The quantities of beta-lactone and ammonia employed in the reaction are not critical and may be varied widely. For example, the reactants may be brought together in equimolecular quantities or an excess of either reactant may be utilized, and in fact highest yields of the desired amino acid are obtained with the preferred solvents when an excess of the ammonia is employed.

The amount of the solvent used is likewise not critical, and any desired quantity may be used. However, it is generally desirable to use an amount such that the reaction mixture may be easily stirred even after the amino acid precipitates, and ordinarily an amount of about three to four moles of solvent to each mole of the beta-lactone is sufficient for this purpose, although from 1 to 10 moles of solvent for each mole of beta-lactone, or even other ratios, may also be used.

The reaction is preferably carried out under conditions of temperature and pressure such as may exist in the atmosphere. Accordingly, temperatures as low as $-50°$ C. or lower and as high as 60° C. or even higher may be used. A preferred temperature range when utilizing the preferred class of solvents, that is, alcohols, esters and nitriles, is from 0° C. to 50° C. However, other temperatures and pressures may be used provided the solution of beta-lactone is maintained in the liquid condition during the reaction.

The following specific examples are intended to illustrate the practice of this invention, but it is to be understood that the invention is not limited thereto, for there are, of course, numerous variations and modifications. Unless otherwise indicated, all parts are by weight.

EXAMPLE I 72 parts (1 mole) of beta-propiolactone are added to 300 ml. of tertiary butanol and the solution cooled to 16° C. 17 parts of ammonia gas are then slowly bubbled into the solution with constant stirring. After a few minutes a solid begins to precipitate. After the addition of the ammonia is complete the solid is removed by filtering and dried. The solid is then dissolved in a minimum amount of water and the solution concentrated under vacuum. The partially crystalline material remaining is taken up with 300 ml. of methanol from which 70.5 parts (79%) of beta-alanine crystallize. M. P. 197° to 200° C.

*Analysis*

| | Calculated for $C_3H_7O_2N$ | Found for $C_3H_7O_2N$ |
|---|---|---|
| | *Per cent* | *Per cent* |
| C | 40.44 | 40.37 |
| H | 7.92 | 7.99 |
| N | 15.72 | 15.83 |

EXAMPLE II 144 parts (2 moles) of beta-propiolactone are added to 600 ml. of tertiary butanol and the solution is heated to 30° C. An excess of ammonia gas is then slowly bubbled into the soluution with constant stirring. A solid begins to precipitate almost immediately and a small amount of beta-alanine is added to seed the reaction product. After two hours ammonia is no longer absorbed and the solid is separated from the liquid by filtering and dried. The solid is dissolved in water and the water removed under vacuum. 500 ml. of methanol are added whereupon 144 parts (81.8%) of substantially pure beta-alanine (M. P. 190° to 200° C.) crystallize.

EXAMPLES III TO VI

Example I is repeated using each of the following alcohols in turn; methyl alcohol, ethyl alcohol, propyl alcohol, and isoamyl alcohol. In each case a good yield of pure beta-alanine is obtained.

EXAMPLE VII 72 parts (1 mole) of beta-propiolactone are added to 300 ml. of acetonitrile and the solution is cooled to a temperature of from 3°–7° C. 17 parts of gaseous ammonia are bubbled into the solution with constant stirring over a period of 3 hours. After the addition of the ammonia is complete the solid which has formed is removed by filtering, washed with ether and dried whereupon 86 parts (96.6%) of substantially pure beta-alanine (M. P. 196°–198° C.) are obtained.

EXAMPLE VIII 72 parts (1 mole) of beta-propiolactone are added to 300 ml. of isopropyl acetate and the solution maintained at a temperature of approximately 5° C. An excess of gaseous ammonia is then bubbled into the solution. A heavy oil layer is formed. The isopropyl acetate is decanted and the oil washed with water. The water is removed under vacuum and the oil seeded with beta-alanine crystals whereupon beta-alanine begins to crystallize. Methanol is then added whereupon further crystallization occurs. 27 parts of beta-alanine (M. P. 190°–192° C.) are obtained.

EXAMPLE IX

Example VIII is repeated utilizing acetone as the solvent for the reaction. Upon purification of the crystallized product, 32 parts of beta-alanine are obtained.

EXAMPLE X 72 parts (1 mole) of beta-propiolactone are dissolved in 600 ml. of nitroethane and the solution is maintained at a temperature of 15° C. Gaseous ammonia is then bubbled into the solution with constant stirring over a period of 2 hours. A reaction product separates which is filtered, heated to decompose any salt formed with ammonia and the solvent, and then dissolved in water. The water is evaporated under vacuum, methanol added and the solution seeded with beta-alanine crystals whereupon a substantial quantity of beta-alanine, formed in the reaction, crystallizes from the solution.

When other beta-lactones of the type disclosed hereinabove are reacted with ammonia in the manner of the above examples, other amino acids are formed. For example, when ammonia is added to a solution of beta-butyrolactone in an alcohol ester or nitrile, aminobutyric acid is formed and when ammonia is reacted with alpha-methyl-beta-propiolactone in a similar manner, alpha-methyl-beta-amino-propionic acid is formed.

The reaction of a beta-lactone with ammonia in accordance with this invention provides a simple method of economically obtaining beta-amino acids, and especially beta-alanine, which are very useful organic compounds. For example, the beta-amino acids and a great many of their derivatives are of great physiological importance, beta-alanine being especially useful in the preparation of pantothenic acid, which in the form of its alkali metal salts is of great value in the treatment of diet deficiencies and malnutrition. They are also useful as intermediates in the preparation of other organic compounds and for many other uses.

Numerous modifications and variations of the invention will be obvious to those skilled in the art and are included within the spirit and scope of the appended claims.

We claim:

1. The method which comprises dissolving a water-soluble, unsubstituted, saturated aliphatic beta-lactone containing from 3 to 6 carbon atoms, in a solvent therefor, said solvent comprising a liquid organic compound which is stable to water and possesses a degree of ionization therein less than that of ammonia, which contains from 1 to 12 carbon atoms and which is composed entirely of aliphatic hydrocarbon structure attached to a single radical selected from the class consisting of —OH,

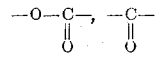

—NO$_2$ and —CN, and adding ammonia to the resulting solution while maintaining a temperature and pressure such that the solvent is maintained in the liquid state, whereupon reaction occurs between said beta-lactone and the ammonia, thereby to yield the corresponding beta-amino carboxylic acid.

2. The method which comprises dissolving beta-propiolactone in a solvent therefor, said solvent comprising a liquid organic compound which is stable to water and possesses a degree of ionization therein less than that of ammonia, which contains from 1 to 12 carbon atoms and which is composed entirely of aliphatic hydrocarbon structure attached to a single radical selected from the class consisting of —OH,

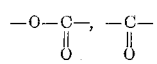

—NO$_2$ and —CN, and adding gaseous ammonia to the resulting solution at atmospheric pressure and at a temperature between 0° C. and 50° C. and such that the solvent is maintained in the liquid state, whereupon reaction occurs between said beta-propiolactone and the ammonia, thereby to obtain beta-alanine.

3. The method which comprises dissolving beta-propiolactone in a liquid alcohol containing from 1 to 12 carbon atoms and composed entirely of an aliphatic hydrocarbon radical attached to a single —OH group, adding ammonia to the resulting solution at atmospheric pressure and at a temperature between 0 and 50° C. and such that the alcohol is maintained in the liquid state, whereupon reaction occurs to form beta-alanine, and separating beta-alanine from the reaction mixture.

4. The method which comprises dissolving beta-propiolactone in a liquid tertiary saturated aliphatic monohydric alcohol containing from 1 to 12 carbon atoms, adding ammonia to the resulting solution at atmospheric pressure and at a temperature between 0 and 50° C. and such that the alcohol is maintained in the liquid state, whereupon reaction occurs to form beta-alanine, and separating beta-alanine from the reaction mixture.

5. The method which comprises dissolving beta-propiolactone in tertiary butanol, adding ammonia to the resulting solution at atmospheric pressure and at a temperature between 0 and 50° C. and such that the tertiary butanol is maintained in the liquid state, whereupon reaction occurs to form beta-alanine, and separating beta-alanine from the reaction mixture.

6. The method which comprises dissolving beta-propiolactone in a liquid organic nitrile containing from 1 to 12 carbon atoms and composed entirely of an aliphatic hydrocarbon radical attached to a single —CN group, adding ammonia to the resulting solution at atmospheric pressure and at a temperature between 0 and 50° C. and such that the organic nitrile is maintained in the liquid state, whereupon reaction occurs to form beta-alanine, and separating beta-alanine from the reaction mixture.

7. The method which comprises dissolving beta-propiolactone in acetonitrile, adding ammonia to the resulting solution at atmospheric pressure and at a temperature between 0 and 50° C. and such that the acetonitrile is maintained in the liquid state, whereupon reaction occurs to form beta-alanine, and separating beta-alanine from the reaction mixture.

THOMAS L. GRESHAM.
FORREST W. SHAVER.

REFERENCES CITED

The following references are of record in the file of this patent:

UNITED STATES PATENTS

| Number | Name | Date |
| --- | --- | --- |
| 2,375,005 | Kung | May 1, 1945 |